United States Patent [19]
von Plessen et al.

[11] 4,148,858
[45] Apr. 10, 1979

[54] PROCESS FOR THE PROTECTION AGAINST CORROSION OF CAST IRON BOILERS

[75] Inventors: Helmold von Plessen, Kelkheim; Kurt Bodenbenner, Wiesbaden, both of Fed. Rep. of Germany

[73] Assignee: Hoechst Aktiengesellschaft, Frankfurt am Main, Fed. Rep. of Germany

[21] Appl. No.: 796,456

[22] Filed: May 12, 1977

[30] Foreign Application Priority Data

May 15, 1976 [DE] Fed. Rep. of Germany ....... 2621658

[51] Int. Cl.$^2$ .................... C23F 11/02; C23F 11/04
[52] U.S. Cl. .................................. 422/12; 252/387; 252/146
[58] Field of Search ............... 252/387, 385, 151, 146, 252/8.55 E; 21/2.5 R, 2.5 B; 106/14; 134/3, 41; 422/12

[56] References Cited

U.S. PATENT DOCUMENTS

| 3,096,169 | 7/1963 | Shapiro et al. | 252/387 |
| 3,375,077 | 3/1968 | Block et al. | 252/387 |
| 3,630,752 | 12/1971 | Scott | 252/387 X |
| 3,876,371 | 4/1975 | Costain et al. | 21/2.5 R |
| 3,887,488 | 6/1975 | Scott et al. | 252/387 X |
| 3,925,245 | 12/1975 | Harris et al. | 252/387 |
| 3,932,130 | 1/1976 | Bennett et al. | 252/387 X |

Primary Examiner—Benjamin R. Padgett
Assistant Examiner—J. L. Barr
Attorney, Agent, or Firm—Curtis, Morris & Safford

[57] ABSTRACT

Gray cast iron can be protected against corrosion by the vapors of boiling concentrated sulfuric acid when a compound containing positive nitrogen, e.g., nitrogen oxide, is introduced into the gas space between the cast iron to be protected and the boiling sulfuric acid.

5 Claims, No Drawings

PROCESS FOR THE PROTECTION AGAINST CORROSION OF CAST IRON BOILERS

The present invention is concerned with the protection of cast iron apparatus, especially boilers, against boiling concentrated sulfuric acid.

Dilute impure sulfuric acid has for a long time been regenerated by the method described by H. Pauling in German Pat. No. 299,774.

According thereto, dilute and optionally impure sulfuric acid is supplied continuously to a stripping column, which is mounted upon an oil- or gas-fired boiler of gray cast iron. The boiler is filled with boiling sulfuric acid of 96 to 97% strength at a temperature of about 320° C. The hot concentrated acid is withdrawn from the contents of the boiler at the same rate as the dilute acid flows thru the stripping column, and is cooled. The process is carried out advantageously with waste acids, which may contain 20 to 30% of water, up to about 2% of organic impurities and inorganic constituents such as metal salts or ammonium sulfate.

The gray cast iron used as the material of the boiler has according to P. Parrish (Gmelins Handbuch 8th Edn., System No. 9, Volume Sulfur A (1953), page 465) the composition: C 2.5 to 3.7%; Si 2 to 4%, Mn 0.5 to 0.7%; S 0.07%; P 0.3 to 0.6% Ni should not be present as an alloy constituent. Our investigations into the structural material of industrial Pauling boilers have shown lamellar graphite structures of about A 3 to C 3 according to ASTM in the pearlitic texture, and the composition C 2.9 to 3.5%; Si 1.6 to 1.9%; P 0.2 to 0.6%; S 0.1 to 0.15%; Mn 0.35 to 0.65%; Cr 0.05 to 0.2%; Ni 0.04 to 0.08%; Cu 0.07 to 0.1%; Al<0.03%.

The boilers have an average life of 2 to 3 years, and the loss due to corrosion is about 1 cm per year. However, longer or very short service lives have also been observed (E. Maahn, Dansk Kemi 44, 105 (1963); Brit. Corros. J. 1966, Vol. 1, page 350).

Sufficient corrosion protection for the gray cast iron of the boilers against the liquid phase of the contents of the boiler can be achieved by the addition of nitric acid. There also come into consideration as corrosion inhibitors for cast iron in hot concentrated sulfuric acid, iron-(III) salts, vanadium(IV) or (V) compounds or chromium(VI) compounds. Moreover, by applying a direct current voltage of 800 to 1200 mV the wall of the boiler in contact with the boiling concentrated sulfuric acid can be rendered passive anodically.

Especially critical is the corrosive attack at zones of the boiler close to the level of the liquid (German Pat. Nos. 639,225 and 699,770). Furthermore, at too low a temperature heavy corrosion damage can occur rapidly on the covers of the boilers of Pauling plants. Thus, the problem of improved protection against corrosion arises not only for the part of the boiler that is in contact with the liquid acid, but at the same time also for the gas space of the boiler. There has now been discovered a method of protecting gray cast iron against corrosion by the vapours of boiling concentrated sulfuric acid, which is characterized in that a compound containing positive nitrogen is introduced into the gas space of the boiler or more generally into the gas space between the gray cast ion to be protected and the boiling sulfonic acid. For this purpose there are primarily suitable inorganic compounds, especially nitrogen oxides of the formula NO, $NO_2$ or $N_2O_3$. Provided that these compounds are used in gaseous form they can easily be blown into the gas space of the boiler. Nitric acid is also suitable as a compound containing positive nitrogen. This liquid compound can be sprayed preferably into the hot gas space where it evaporates rapidly. Nitric acid may also be brought into the gas space by copiously introducing $HNO_3$ into the boiling sulfuric acid, most advantageously thru a dipping tube. By the evaporation of $HNO_3$ the desired protection against corrosion in the vapour space of the boiler is achieved. However, in this modification the requirement for nitric acid is distinctly increased owing to the partial conversion of nitric acid into nitrosyl-sulfuric acid (which remains in the sulfuric acid). This is the case especially in the presence of organic substances or of carbon in the sulfuric acid. Also in this case the metering is difficult.

By the method of the invention it is possible to render passive the cast iron above the surface of the liquid, especially the critical places near the surface of the liquid. This applies especially when the corresponding parts of the boiler are heated to at least 300° C.

The method of the invention may be carried out with one compound containing positive nitrogen or with a mixture of compounds containing positive nitrogen. The method may be combined with the known method for reducing corrosion in the liquid phase. For example, the surfaces covered with liquid may be protected anodically, and nitrogen monoxide introduced into the gas space within the boiler. This mode of procedure permits a minimum use of nitrogen compound and also results in an especially small content of nitrogen compounds in the regenerated acid and gases leaving the plant.

The method of the invention can be used in general where cast iron apparatus is to be protected in the gaseous phase against the attack of boiling concentrated sulfuric acid. This applies especially to apparatus for concentrating sulfuric acid, for example, Pauling plants.

In many Pauling boilers of gray cast iron increased corrosion is observed at the boundaries between the phases, which may result in a deeply incised groove up to 10 cm wide around the boiler. This phenomenon considerably shortens the life of the boiler. By the method of the invention these erosions of the wall of the boiler at the boundaries between the phases can be suppressed. Thus, the method of the invention solves both the problem of checking erosion caused by corrosion at various parts of the boiler (liquid phase and gas phase) and also the problem of specifically reducing erosion in the gas space.

The following Example illustrates the invention.

EXAMPLE

In a round flask of 1 liter capacity having an air-cooled condenser placed thereon and above that a water-cooled condenser a test sample of gray cast iron was suspended in a manner such that the disk-shaped test sample at the boiling temperature was partially immersed (about 1 cm) in 1 kg of concentrated sulfuric acid p.a. A test sample of the same material for comparison was placed in the acid. Into the gas space of the flask was blown continuously in a moderate stream a mixture of nitrogen monoxide, NO, and nitrogen or pure NO, respectively. After termination of the heating, the cast iron test samples were removed from the flask, rinsed, powerfully rubbed with a cloth, dried and weighed. The samples had a diameter of about 3 cm and consisted of lamellar gray cast iron having the graphitic structure A 4 according to ASTM in a pearlitic texture and the composition C 3.3%; Si 2.4%; P 0.63%; S 0.15%; Mn 0.52%; Cr 0.068%; Ni 0.043%; Cu 0.099%; Al <0.03%; remainder iron and the impurities usual in gray cast iron.

TABLE

|  | 1 | 2 | 3 |
|---|---|---|---|
| Test conditions Gas space | 35.7 lt/hr of $N_2$ | 1 lt/hr of NO 35.7 lt/hr of $N_2$ | considerable quantities of NO × (daily addition of 4.5 g of $NaNO_3$ and 0.5 g of $NaNO_2$) |
| Duration of the test (minutes). | 1455 | 1455 | 12.160 |
| Area of the samples. |  |  |  |
| (a) partially immersed sample ($cm^2$) | 18.8 | 19.4 | 19.8 |
| (b) fully immersed sample ($cm^2$) | 18.8 | 18.1 | 19.9 |
| Corrosion loss. |  |  |  |
| (a) partially immersed sample (mg) | 646.5 | 193.5 | 337.4 |
| (b) fully immersed sample (mg) | 1927.9 | 1231.1 | 360.5 |
| Corrosion speed. |  |  |  |
| (a) partially immersed sample $\left(\dfrac{mg}{cm^2 \cdot day}\right)$ | 34.0 | 9.9 | 2.0 |
| (b) fully immersed sample | 101.5 | 67.3 | 2.2 |
| Ratio of the corrosion speeds (%) a/b | 33.5 | 14.7 | 94 |

These tests show, above all, that with increasing use of NO the corrosion speed decreases both with the partially and fully immersed cast iron samples. With complete passivation (Test 3) the liquid and gaseous phases in the reaction vessel are filled with nitrous gases to such an extent that the corrosion speeds of both samples reach a minimum and are practically the same. Thus, the ratio of the corrosion speeds reaches a maximum (94%).

Characteristic of the invention is the fact that with the addition of increasing quantities of NO in the gas space the corrosion speeds of the partially immersed sample decrease to a greater extent that do those of the fully immersed sample, so that the ratio of the corrosion speeds reaches a minimum (14.7%). This minimum shows that in the gas space a passivation is possible, which does not originate from a nitrous content accumulating in the liquid caused, for example, by spraying.

What is claimed is:

1. Process for the protection of gray cast iron against corrosion by the vapors of boiling concentrated sulfuric acid, which comprises introducing an inorganic compound containing positive nitrogen selected from the group consisting of $NO, NO_2, N_2O_3$, and nitric acid into a vapor filled gas space between the boiling sulfuric acid and the cast iron to be protected.

2. Process according to claim 1, wherein the compound is a nitrogen oxide.

3. Process according to claim 1, wherein the compound is nitric acid.

4. Process according to claim 1, wherein the surface of gray cast iron to be protected has a temperature of at least 300° C.

5. Process according to claim 1, wherein the compound containing positive nitrogen is sprayed as a liquid or is blown as a gas into the gas space of the apparatus to be protected.

* * * * *